United States Patent
Tan et al.

(10) Patent No.: US 6,738,312 B1
(45) Date of Patent: May 18, 2004

(54) ARRANGEMENT AND METHOD FOR MEASURING THE SPEED OF SOUND

(75) Inventors: Kah Chye Tan, Singapore (SG); Zenton Goh, Singapore (SG); Kwok Chiang Ho, Singapore (SG)

(73) Assignee: Addest Technovation Pte Ltd. (SG)

( * ) Notice: Subject to any disclaimer, the term of this patent is extended or adjusted under 35 U.S.C. 154(b) by 0 days.

(21) Appl. No.: 10/311,170

(22) PCT Filed: Jun. 12, 2000

(86) PCT No.: PCT/SG00/00085
§ 371 (c)(1),
(2), (4) Date: Apr. 16, 2003

(87) PCT Pub. No.: WO01/96822
PCT Pub. Date: Dec. 20, 2001

(51) Int. Cl.[7] .................................................. G01H 5/00
(52) U.S. Cl. .......................................... 367/89; 367/902
(58) Field of Search .................................. 367/89, 902

(56) References Cited

U.S. PATENT DOCUMENTS

| | | | |
|---|---|---|---|
| 4,926,395 A | 5/1990 | Boegeman et al. | |
| 5,557,047 A | 9/1996 | Koide | |
| 2002/0064090 A1 * | 5/2002 | Su | 367/99 |

FOREIGN PATENT DOCUMENTS

| | | | |
|---|---|---|---|
| CA | 2329884 | * 3/2002 | G01F/23/96 |
| JP | 55 140116 | 1/1981 | |
| JP | 56 067723 | 8/1981 | |

* cited by examiner

*Primary Examiner*—Daniel T. Pihulic
(74) *Attorney, Agent, or Firm*—Myers Dawes Andras & Sherman LLP; Joseph C. Andras

(57) ABSTRACT

The invention relates to an arrangement for measuring the speed of sound, the arrangement comprising: an electrical pulse generating means (402) for generating an output electrical pulse signal (404), a transmitting transducer (403) for converting said output electrical pulse signal (404) into an output acoustic pulse signal (405), a reflector (407) for reflecting said output acoustic pulse signal (405), thereby producing a reflected acoustic pulse signal (409), a receiving transducer (408) being arranged such as to receive said output acoustic pulse signal (405) transmitted directly from said transmitting transducer and said reflected acoustic pulse signal (409) reflected by said reflector, wherein said receiving transducer converts the received output acoustic pulse signal (405) into a reconstructed output electrical pulse signal (410) and the reflected acoustic pulse signal (409) into a reconstructed reflected electrical pulse signal (411), a speed determination means for determining the speed of sound (412) using the reconstructed output electrical pulse signal (410) and the reconstructed pulse signal (411).

18 Claims, 3 Drawing Sheets

ARRANGEMENT AND METHOD FOR MEASURING THE SPEED OF SOUND

BACKGROUND OF THE INVENTION

The present invention relates to the measurement of the speed of sound. More specifically, the present invention relates to a method, and an arrangement for measuring the speed of sound based on the travel time of an acoustic signal through a predetermined distance.

FIG. 1 shows a prior-art arrangement 100 and method for measuring the speed of sound, as described in U.S. Pat. No. 4,926,395.

A control module 101 generates an output electrical pulse signal 102. The instance when the event starts, i.e. when the output electrical pulse signal 102 is generated, is denoted as $t_1$. The output electrical pulse signal 102 is sent to a transmitting transducer 103.

The transmitting transducer 103 converts the output electrical pulse signal 102 into an acoustic pulse signal 104.

Next, the acoustic pulse signal 104 output by the transmitting transducer 103 travels through a medium 105, such as air or water, hits a reflector 106 and is reflected.

The reflected acoustic pulse signal 107 then travels back towards a receiving transducer 108 which receives the reflected acoustic pulse signal 107 and converts it into an electrical pulse signal which will be referred to in the following as reconstructed reflected electrical pulse signal 109.

In this known arrangement the front ends of the transmitting and receiving transducers lie in a plane parallel to the plane of the reflector 106, since the receiving transducer and the transmitting transducer are embodied by a single transducer.

Next, the reconstructed reflected electrical pulse signal 109 is sent to the control module 101.

Based on the instance when the reconstructed reflected electrical pulse signal 109 is received by the control module 101, the traveling time of the acoustic pulse signal, i.e. the time which was necessary for the output and reflected acoustic pulse signals to travel through the medium 105 is determined. The determination of the traveling time will be described below.

The speed of sound 110, s, determined and output by the control module 101 is given by $$s = \frac{2 \cdot d}{t_0}, \quad (1)$$

where d is the distance between the transmitting transducer 103 (or the receiving transducer 108) and the reflector 106, and $t_0$ is the traveling time which is the sum of the time needed for the output acoustic pulse signal 104 to travel through the distance between the transmitting transducer 103 and the reflector 106 and the time needed for the reflected acoustic pulse signal 107 to travel through the distance between the reflector 106 and the receiving transducer 108.

In the following, the determination of the traveling time $t_0$ according to the state of the art will be described.

The output electrical pulse signal 102 generated by the control module 101 is typically a gated sinusoidal signal that is of a finite time duration, as shown in FIG. 2a.

Due to the inherent characteristics of the transmitting transducer 103 and the receiving transducer 108, the transducers 103 and 104 will, in general, deteriorate the characteristics of the signals in the course of the respective signal conversion processes. This means for example that the waveform of the acoustic pulse signal 104 does not exactly correspond to the waveform of the output electrical pulse signal 102 from which it is generated by the transmitting transducer 103. Similarly, the waveform of the reconstructed reflected electrical pulse signal 109 does not exactly correspond to the waveform of the reflected acoustic pulse signal 107 from which the reconstructed reflected electrical pulse signal 109 is generated by the receiving transducer 108.

FIG. 2b shows an example of a reconstructed reflected electrical pulse signal 109 which is received by the control module 101 and originates from an input gated sinusoidal signal as the output electrical pulse signal 102 delivered to the transmitting transducer 103.

When the control module 101 receives a signal, it will decide whether the received signal is the reconstructed reflected electrical pulse signal 109 or just background noise.

For ease of discussion, the received signal is considered to be a digital signal.

When the control module 101 receives one digital sample of the received signal, it compares the amplitude of the current sample of the digital signal with two thresholds 301, 302, namely an upper threshold 301 and a lower threshold 302 (see FIG. 3).

In this context, amplitude is meant to be the voltage level of the digital signal at the current time instance.

If the absolute value of the amplitude of the current sample of the digital signal is larger than the absolute value of the upper or lower thresholds, the decision is that the reconstructed reflected electrical pulse signal 109 is detected, and this current time instance is then denoted by $t_2$ (see FIG. 3).

Otherwise, the decision of the control module 101 is that the reconstructed reflected electrical pulse signal 109 is not detected, and the control module 101 continues to take the next digital sample and performs the comparison as described above until the reconstructed reflected electrical pulse signal 109 is detected.

The traveling time $t_0$ is then estimated to be an estimated traveling time $\hat{t}_0$, which is given by $$\hat{t}_0 = t_2 - t_1, \quad (2)$$

where $t_1$ is the time instance when the output electrical pulse signal 102 starts to be generated by the control module 101, and $t_2$ is the time instance when the reconstructed reflected electrical pulse signal 109 is detected by the control module 101.

This completes the description of how the traveling time $t_0$ is estimated by the calculated time $\hat{t}_0$.

However, the prior-art method described above particularly has two problems that cause the estimation of $t_0$ by $\hat{t}_0$ to be inaccurate.

Firstly, the conversion of the output electrical pulse signal 102 into its acoustic form (the acoustic pulse signal 104) by the transmitting transducer 103 is not instantaneous, mainly due to physical limitations of transducers. Indeed, there is a considerable time delay between the instance when the output electrical pulse signal 102 starts to be generated by the control module 101 (i.e., $t_1$) and the instance when the acoustic pulse signal 104 starts to travel in the medium 105. If the delay is of a fixed value for different runs/scenarios of the speed-of-sound measurement, one could circumvent this problem by replacing $t_1$ by $t_1$ plus this fixed value. However, the delay is not constant for different runs/scenarios of the speed-of-sound measurement.

Secondly, the detection of the reconstructed reflected electrical pulse signal 109 is also not instantaneous. Indeed, the control module 101 can detect the arrival of the reconstructed reflected electrical pulse signal 109 only after a considerable time delay of about a few cycles of the reconstructed reflected electrical pulse signal 109, as shown in FIG. 3. If the delay is of a fixed value, for example one cycle for different runs/scenarios of the speed-of-sound measurement, one could circumvent this problem by replacing $t_2$ by $t_2$ minus this fixed value. However, also this delay is not constant for different runs/scenarios of the speed-of-sound measurement.

These problems become even worse when using low cost components, like a personal computer with a sound card as the control module 101, a commercial, rather low-cost loudspeaker as transmitting transducer 103, a plastic compact disc case as the reflector 106, and a commercial, rather low-cost microphone as the receiving transducer 108.

SUMMARY OF THE INVENTION

Thus, it is a first object of the present invention to provide an arrangement for measuring the speed of sound with improved accuracy particularly even when using low cost components, especially for educational purposes like for experimental speed-of-sound measurements in high schools.

To achieve the first object, according to a first aspect of the invention, an arrangement for measuring the speed of sound comprises an electrical pulse generating means for generating an electrical pulse signal which will be referred to in the following as output electrical pulse signal. The electrical pulse generating means is coupled, e.g. via a cable, to a transmitting transducer for converting the output electrical pulse signal into an acoustic pulse signal which will be referred to in the following as output acoustic pulse signal. The transmitting transducer may be a commercial, rather low-cost loudspeaker. Furthermore, a receiving transducer for converting an acoustic pulse signal into an electrical pulse signal is provided. The receiving transducer may be a commercial, rather low-cost microphone. Both transducers are coupled with a reflector in such a manner that the output acoustic pulse signal generated and output by the transmitting transducer is reflected by the reflector, thereby generating a reflected acoustic pulse signal which is received by the receiving transducer. According to this first aspect of the invention the receiving transducer is arranged, relative to the transmitting transducer, in such a manner that it receives both the output acoustic pulse signal and the reflected acoustic pulse signal and converts them to respective electrical pulse signals. The electrical pulse signal generated from the output acoustic pulse signal by the receiving transducer will be referred to in the following as reconstructed output electrical pulse signal, whereas the electrical pulse signal generated from the reflected acoustic pulse signal will be referred to in the following as reconstructed reflected electrical pulse signal. Furthermore, the arrangement according to this aspect of the invention comprises a speed determination means for determining the speed of sound using the reconstructed output electrical pulse signal and also the reconstructed reflected electrical pulse signal.

The electrical pulse generating means and/or the speed determination means may be implemented in a personal computer (PC). For example, both the electrical pulse generating means and the speed determination means may be implemented by a PC comprising a sound card.

Furthermore, the reflector may be a plastic element, in particular a compact disc case.

An advantage of the arrangement according to the invention can be seen in the fact that, even if very low-cost components are used, the accuracy of the speed-of-sound measurement is improved, since by determining the speed of sound based on the reconstructed output electrical pulse signal the uncertainty in the speed of sound calculation caused by the unknown time delay in the conversion process of transmitting transducer as described above in conjunction with the state of art arrangement is eliminated. Furthermore, this arrangement is very cheap and thus especially suitable for low-cost applications.

According to a further embodiment of the invention, the electrical pulse generating means is arranged in such a manner that it can generate an output electrical pulse signal with a waveform, which begins with a dominant cycle with maximum amplitude, and wherein the amplitude of the end portion of the output electrical pulse signal tapers off to either zero or a considerably smaller value as compared to the maximum amplitude of the output electrical pulse signal in its dominant cycle.

The output electrical pulse signal may further contain an initial portion whose amplitude is considerably smaller than the maximum amplitude of the output electrical pulse signal. For ease of discussion, the output electrical pulse signal is considered not to have such an initial portion.

With this embodiment of the invention, the robustness and the accuracy of the speed of sound measurement is further improved, since with such a waveform of the output electrical pulse signal the uncertainty in the speed of sound calculation caused by the unknown time delay in the detection process of the speed determination means as described above in conjunction with the state of art arrangement is eliminated or at least reduced.

According to a further embodiment of the invention, a wave guide is provided, which is arranged between the transmitting transducer and the reflector, and/or between the receiving transducer and the reflector.

Furthermore, the wave guide may be a hollow cylindrical tube, which is made by rolling a long piece of paper into a hollow cylinder.

With such a wave guide, the loss of signal energy is further reduced, thus providing better measurement results due to less reduction of the signal amplitude when traveling through the medium.

Furthermore, according to a preferred embodiment of the invention, the speed determination means is arranged in such a manner, that it determines the speed of sound using a first instance, when the second peak of the dominant cycle of the reconstructed output electrical pulse signal is detected, and a second instance, when the second peak of the dominant cycle of the reconstructed reflected electrical pulse signal is detected.

The second peak of the dominant cycle (which is the peak of the second half-cycle of the dominant cycle) of the reconstructed output electrical pulse signal is detected when its absolute value is larger than the absolute value of a first threshold, and the second peak of the dominant cycle of the reconstructed reflected electrical pulse signal is detected when its absolute value is larger than the absolute value of a second threshold. The first and second thresholds may have the same or different values. Preferably, the absolute value of the first threshold is larger than the absolute value of the second threshold, since in general the energy and, therefore, the amplitude of the reconstructed output electrical pulse signal is higher than that of the reconstructed reflected electrical pulse signal.

According to the invention it is advantageous to choose the second half-cycle instead of the first half-cycle, since it was observed that in some scenarios, the peak of the first half-cycle of the dominant cycle of the reconstructed reflected electrical pulse signal is not significant enough, while in other scenarios it is significant enough, i.e., the absolute value of which is, on some occasions, smaller than the absolute value of the second threshold, but on other occasions larger. Therefore, detecting the peak of the first half-cycle of the dominant cycle would in many cases affect the accuracy of estimating the traveling time $t_0$, since in some occasions the time at which a peak is detected would correctly correspond to the peak of the first half-cycle of the dominant cycle, but it would, in other occasions, incorrectly correspond to the peak of the first half-cycle of a cycle following the dominant cycle, because the peak of the first half-cycle of the dominant cycle is not detected. On the other hand, the peak of the second half-cycle of the dominant cycle of the reconstructed reflected electrical pulse signal is consistently significant enough.

Further, it is a second object of the present invention to provide a method for measuring the speed of sound with improved accuracy particularly even when using low cost components.

To achieve the second object, an output electrical pulse signal is generated in a first step of the method for measuring the speed of sound according to a second aspect the invention. Next, the output electrical pulse signal is converted into an output acoustic pulse signal. After having been reflected by a reflector, the thus generated reflected acoustic pulse signal is received and converted into a reconstructed reflected electrical pulse signal. As a last step, the speed of sound is determined using the reconstructed reflected electrical pulse signal.

Furthermore, according to a preferred embodiment of the invention, an output electrical pulse signal is generated in a first step of the method for measuring the speed of sound according to a second aspect the invention. Next, the output electrical pulse signal is converted into an output acoustic pulse signal and into a reconstructed output electrical pulse signal. After having been reflected by a reflector, the thus generated reflected acoustic pulse signal is received and converted into a reconstructed reflected electrical pulse signal. As a last step, the speed of sound is determined using the reconstructed reflected electrical pulse signal and the reconstructed output electrical pulse signal.

The embodiments described above with reference to the arrangement do apply as well to the method according to the present invention.

DETAILED DESCRIPTION OF PREFERRED EMBODIMENTS OF THE INVENTION

Preferred embodiments of the invention will now be described with reference to the accompanying drawings.

Figure 4:
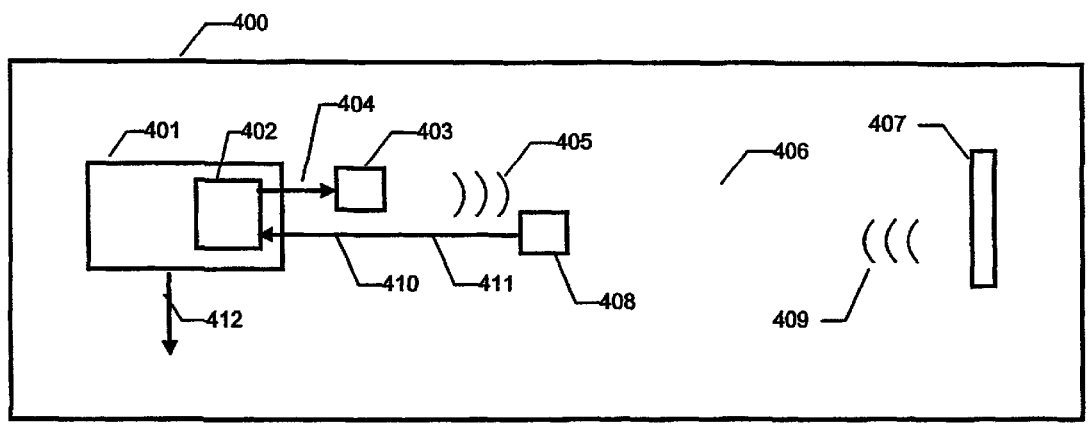
FIG. 4 shows a block diagram of an arrangement for measuring the speed of sound according to a first embodiment of the present invention.

FIG. 4 shows an arrangement 400 with a personal computer (PC) 401 comprising a sound card 402 as the electrical pulse generating means and as the speed determination means for measuring the speed of sound in air.

According to this embodiment, only standard PC accessories/components are used in the arrangement, in particular a soundcard, microphone and loudspeaker, but not non-standard PC accessories/components such as other PC plug-in cards, external units with PC interface, and ultrasound sensor.

Note that using the soundcard 402 of the personal computer 401 for generating the output electrical pulse signal 404 means that the output electrical pulse signal 404 will be in the audible sound frequency range, i.e., 20 Hz to 20,000 Hz, but not in the ultrasound frequency range, i.e. not more than 20,000 Hz.

In this case, the PC 401 with the soundcard 402 forms the control module.

Furthermore, a loudspeaker 403 is provided as the transmitting transducer. The loudspeaker 403 is connected to the soundcard 402 via a cable.

The output electrical pulse signal 404 generated by the soundcard 402 is provided to the loudspeaker 403, by which it is converted into an output acoustic pulse signal 405. The acoustic pulse signal 405 is then sent by the loudspeaker 403 through the medium, according to this embodiment, air 406 so that at least a part of the acoustic pulse signal 405 hits a reflector 407 and is reflected by the reflector 407.

The output acoustic pulse signal 405 is further received by a microphone 408, which is used as the receiving transducer. Thus, in other words, the receiving transducer is arranged with reference to the loudspeaker 403 in such a manner as clearly shown in FIG. 4 that it receives the output acoustic pulse signal 405 coming directly from the loudspeaker 403 and converts the same into a reconstructed output electrical pulse signal (see FIG. 6a).

The reflector 407 according to this embodiment is a CD (compact disc) plastic case. It should be noted, that the reflector 407 can be formed by any other component which can reflect the output acoustic pulse signal 405, when it hits the reflector 407.

The reflector 407 thus reflects the output acoustic pulse signal 405 and sends the reflected acoustic pulse signal 409 to the microphone 408.

The microphone 408 converts the received signals, i.e. both the received output acoustic pulse signal 405 and the received reflected acoustic pulse signal 409, into the reconstructed output electrical pulse signal 410 and the reconstructed reflected electrical pulse signal 411, respectively, which are provided to the soundcard 402 of the PC 401.

In the PC 401, the traveling time $t_0$ is estimated as the estimated traveling time $\tilde{t}_0$, which is given by $$\tilde{t}_0 = t_4 - t_3, \qquad (3)$$

where
- $t_3$ is the instance when the peak of the second half-cycle of the dominant cycle of the reconstructed output electrical pulse signal 410 is detected, as shown in FIG. 6a for an illustration, and
- $t_4$ is the instance when the peak of the second half-cycle of the dominant cycle of the reconstructed reflected electrical pulse signal 411 is detected, as shown in FIG. 6b for an illustration.

Figure 6:
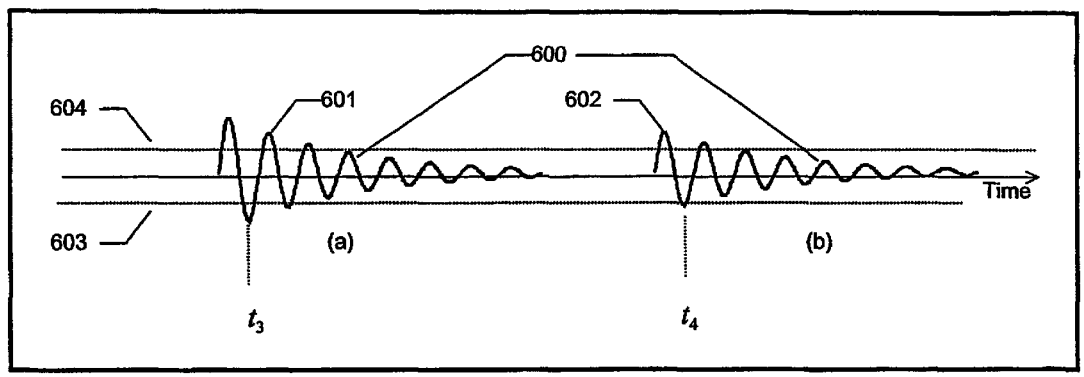
FIG. 6 shows a diagram illustrating the detection of the reconstructed output electrical pulse signal (FIG. 6a) and the reconstructed reflected electrical pulse signal (FIG. 6b) in the control module according to an embodiment of the present invention.

FIG. 6 shows an example of a signal 600 (comprising the reconstructed output electrical pulse signal 410 and the reconstructed reflected electrical pulse signal 411) received by the PC 401 and the positions of $t_3$ and $t_4$.

The left part 601 of the signal 600 (FIG. 6a) is the reconstructed output electrical pulse signal 410. The right part 602 of the signal 600 (FIG. 6b) is the reconstructed reflected electrical pulse signal 411.

Now it will be explained in detail how $t_3$ and $t_4$ are obtained, using the example shown in FIG. 6.

In this paragraph, it will be explained how $t_3$, i.e. the time instance when the peak of the second half-cycle of the dominant cycle of the reconstructed output electrical pulse signal 410 is detected, is obtained. For ease of discussion, the received signal is considered to be a digital signal. First, based on a priori knowledge about the pulse shape, according to this embodiment, it is known that the second half-cycle is negative (and not positive) in this example. When the PC 401 receives one digital sample of the received signal, it compares the amplitude of the current sample of the received signal with the lower threshold 603. (If the second half-cycle would be positive, the amplitude would be compared to the upper threshold 604.) If the absolute value of the amplitude of the current sample of the received signal is larger than the absolute value of the lower threshold 603, the decision is made that the reconstructed output electrical pulse signal 410 is detected. Otherwise the decision is that the received signal is not the reconstructed output electrical pulse signal 410, i.e. this latter is not detected, and the control module continues to take the next digital sample and performs the comparison as described above until the reconstructed output electrical pulse signal 410 is detected. It will then proceed to look for a local absolute maximum point by comparing the next sample with the current sample, the second next sample with the next sample and so on, and to denote the time instance corresponding to this local absolute maximum point as $t_3$ (see FIG. 6). Note that $t_3$ corresponds to the peak of the second half-cycle of the dominant cycle of the reconstructed output electrical pulse signal 410.

In this paragraph, it will be explained how $t_4$, i.e. the time instance when the peak of the second half-cycle of the dominant cycle of the reconstructed reflected electrical pulse signal 411 is detected, is obtained. Based on a priori knowledge of the pulse length, it is waited for a certain fixed period of time after $t_3$ before the search for $t_4$ is started. After such a period of time, the search for $t_4$ is started using the same method as for the search for $t_3$ described in the previous paragraph, except that the value of the threshold may be different from that used for the search for t3 (note that in the example shown in FIG. 6, the same threshold value is used for searching both for $t_3$ and $t_4$). Note that $t_4$ corresponds to the peak of the second half-cycle of the dominant cycle of the reconstructed reflected electrical pulse signal 411.

With the measurement arrangement shown in FIG. 4 and the waveform of the generated output electrical pulse signal shown in FIG. 5a or 5b and described more in detail in the following, $t_3$ and $t_4$ do not have the "delay problem" that $t_1$ and $t_2$ according the state of art arrangement (see FIG. 1) have faced, and so the above mentioned problems are solved. Consequently, the estimation of $t_0$ becomes more accurate.

Thus, as a last step, the speed of sound 412, s', is determined according to the following formula:

$$s' = \frac{2 \cdot d'}{\tilde{t}_0} \qquad (4)$$

where
- d' is the distance between the microphone 408 and the reflector 106,
- $\tilde{t}_0$ is the estimated traveling time given in Equation 3.

Figure 5:
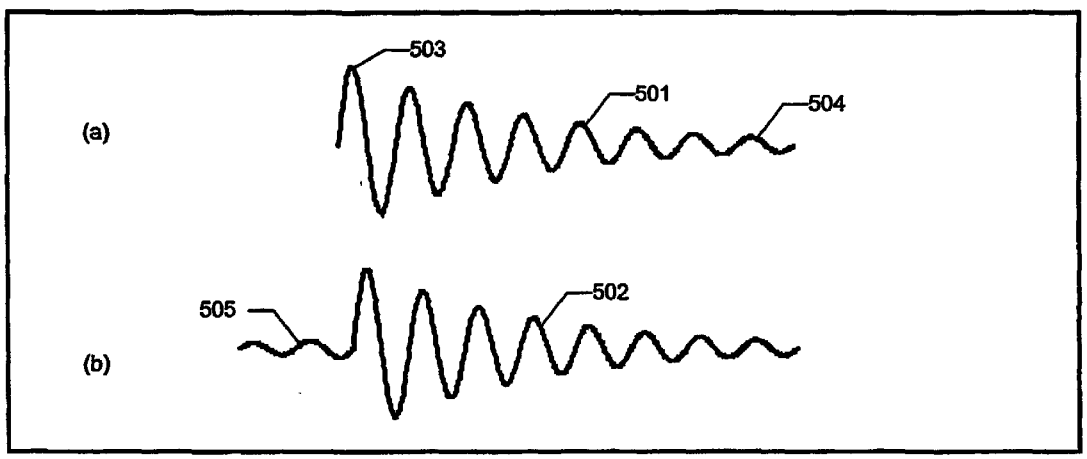
FIG. 5a and 5b show waveforms of output electrical pulse signals according to an embodiment of the present invention.

Examples of the waveforms of the generated output electrical pulse signal 404 according to the invention are shown in FIG. 5a and FIG. 5b.

The characteristics of the generated output electrical pulse signal 501 as shown in FIG. 5a are as follows:
- the signal 501 as shown in FIG. 5a begins with a dominant cycle 503 with maximum amplitude, and
- the amplitude of the end portion 504 of the signal 501 tapers off to a considerably smaller value as compared to the maximum amplitude of the signal 501.

The characteristics of the generated output electrical pulse signal 502 as shown in FIG. 5b are similar to the signal 501, wherein the signal 502 further contains an initial portion 505 whose amplitude is considerably smaller than the maximum amplitude of the signal 502. For ease of discussion, the output electrical pulse signal 404 is considered not to have such an initial portion.

Figure 2:
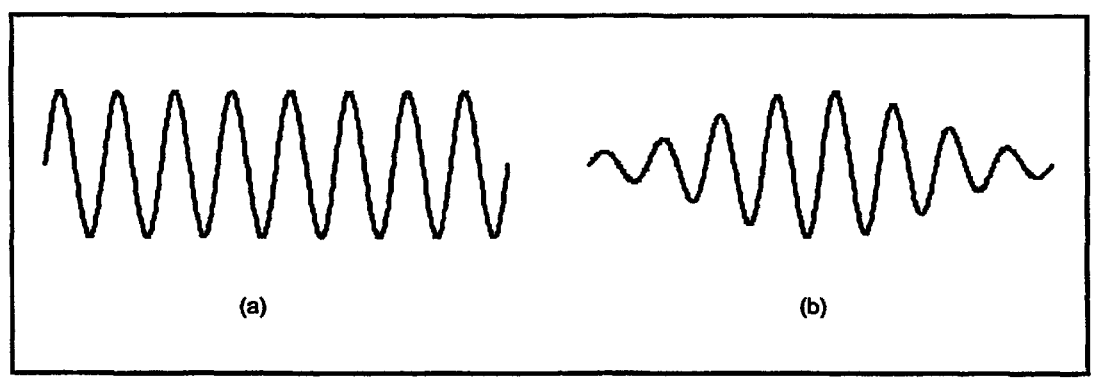
FIGS. 2a and 2b show a waveform of a typical output electrical pulse signal (FIG. 2a) and the corresponding reconstructed reflected electrical pulse signal (FIG. 2b) according to the state of the art.
Figure 3:
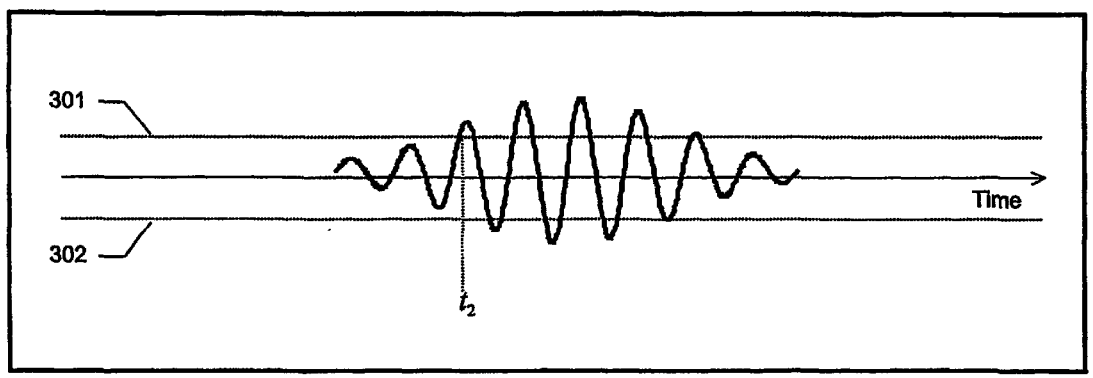
FIG. 3 shows a diagram illustrating the detection of the reconstructed reflected electrical pulse signal in the control module according to the state of the art.

It shall be highlighted that it is advantageous according to the invention to use the proposed pulse signal as described above with reference to FIG. 5a or 5b to be the output electrical pulse signal 404 generated by the soundcard 402. Indeed, if the conventional gated sinusoidal signal as shown in FIG. 2a is used as the output electrical pulse signal, a problem may arise as follows. If the gated sinusoidal signal has a short duration, the reconstructed reflected electrical pulse signal will likely be severely distorted in the sense that its waveform will be very different from that of the output electrical pulse signal 404, and so determination of the time $t_4$ may be difficult and unreliable. On the other hand, if the gated sinusoidal signal as the output electrical pulse signal has a long duration, in order to solve this problem, it may lead to another problem in that the reconstructed output electrical pulse signal may then be overlapped with the reconstructed reflected electrical pulse signal and so determination of the time $t_4$ may again be difficult.

As for this waveform illustrated in FIG. 5a and FIG. 5b, the signal's duration is set to be quite long so that the problem due to short duration mentioned above is overcome. Now with a long duration, the "overlapping problem" mentioned in the previous paragraph may be faced. However, since the proposed output electrical pulse signal according to the invention has a taper-off end, the absolute values of the amplitudes of the portion of the reconstructed output electrical pulse signal that overlaps with the dominant cycle of the reconstructed reflected electrical pulse signal are significantly smaller than the absolute value of the amplitude of the dominant cycle of the reconstructed reflected electrical pulse signal, determination of the time $t_4$ will not be difficult.

Therefore, with the waveform proposed by the invention, both problems mentioned above are overcome.

Figure 1:
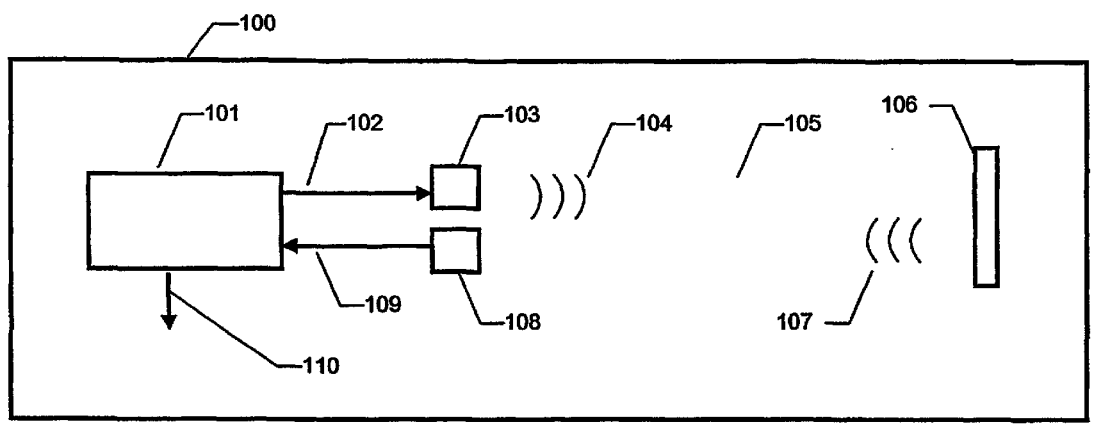
FIG. 1 shows a block diagram of an arrangement for measuring the speed of sound according to the state of the art.

It should be further noted that it lies within the scope of the invention to use the above proposed waveform for the output electrical pulse signal also with the known arrangement shown in FIG. 1, since the use of such a waveform even without the arrangement proposed by the invention would significantly improve the measurement accuracy as described above.

Figure 7:
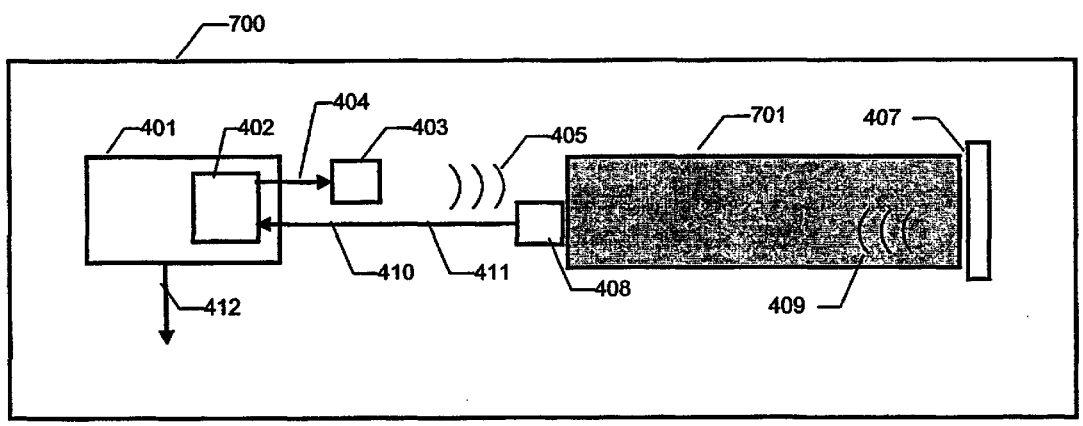
FIG. 7 shows a block diagram of an arrangement for measuring the speed of sound according to a second embodiment of the present invention.

According to a further embodiment of the invention as shown in FIG. 7, a wave guide 701 is added in between the microphone 408 and the reflector 407. Otherwise this embodiment is similar to the first embodiment described in conjunction with FIG. 4.

What is claimed is:

1. An arrangement for measuring the speed of sound, comprising:
    an electrical pulse generating means for generating an output electrical pulse signal,
    a transmitting transducer for converting said output electrical pulse signal into an output acoustic pulse signal,
    a reflector for reflecting said output acoustic pulse signal, thereby producing a reflected acoustic pulse signal,
    a receiving transducer being arranged such as to receive said output acoustic pulse-signal transmitted directly from said transmitting transducer and said reflected acoustic pulse signal reflected by said reflector, wherein said receiving transducer converts the received output acoustic pulse signal into a reconstructed output electrical pulse signal and the reflected acoustic pulse signal into a reconstructed reflected electrical pulse signal,
    a speed determination means for determining the speed of sound using the reconstructed output electrical pulse signal and the reconstructed reflected electrical pulse signal.

2. The arrangement for measuring the speed of sound according to claim 1,
    wherein the electrical pulse generating means is arranged in such a manner that it can generate an output electrical pulse signal with a waveform,
        which has a dominant cycle with a maximum amplitude, and
        wherein the amplitude of the end portion of the output electrical pulse signal tapers off to either zero or a smaller value as compared to the maximum amplitude of the output electrical pulse signal in its dominant cycle.

3. The arrangement for measuring the speed of sound according to claim 2,
    wherein the electrical pulse generating means is arranged in such a manner that it can generate an output electrical pulse signal with a waveform, wherein the output electrical pulse signal contains an initial portion whose amplitude is smaller than the maximum amplitude of the output electrical pulse signal.

4. The arrangement for measuring the speed of sound according to claim 1, wherein the electrical pulse generating means and/or the speed determination means are implemented in a personal computer.

5. The arrangement for measuring the speed of sound according to claim 1, wherein the electrical pulse generating means comprises a sound card.

6. The arrangement for measuring the speed of sound according to claim 1, wherein the transmitting transducer is a loudspeaker.

7. The arrangement for measuring the speed of sound according to claim 1, wherein the receiving transducer is a microphone.

8. The arrangement for measuring the speed of sound according to claim 1, wherein the reflector is a plastic element, in particular a compact disc case.

9. The arrangement for measuring the speed of sound according to claim 1, further comprising a wave guide, which
    is arranged between the transmitting transducer and the reflector, and/or
    is arranged between the receiving transducer and the reflector.

10. The arrangement for measuring the speed of sound according to claim 1, wherein the speed determination means is arranged in such a manner, that it determines the speed of sound using
    a first time instance, when the peak of the second half-cycle of the dominant cycle of the reconstructed output electrical pulse signal is detected, and
    a second instance, when the peak of the second half-cycle of the dominant cycle of the reconstructed reflected electrical pulse signal is detected.

11. The arrangement for measuring the speed of sound according to claim 10,
    wherein the speed determination means is arranged in such a manner,
        that it detects the peak of the second half-cycle of the dominant cycle of the reconstructed output electrical pulse signal when its absolute value is above a first threshold, and
        that it detects the peak of the second half-cycle of the dominant cycle of the reconstructed reflected electrical pulse signal when its absolute value is above a second threshold.

12. The arrangement for measuring the speed of sound according to claim 11,
    wherein the speed determination means is arranged in such a manner that the first threshold and the second threshold have the same value.

13. A method for measuring the speed of sound, comprising the following steps:
    generating an output electrical pulse signal,
    converting the output electrical pulse signal into an output acoustic pulse signal,
    generating a reconstructed output electrical pulse signal from the output acoustic pulse signal,
    reflecting the output acoustic pulse signal, thereby producing a reflected acoustic pulse signal,
    converting the reflected acoustic pulse signal into a reconstructed reflected electrical pulse signal,
    determining the speed of sound using the reconstructed reflected electrical pulse signal and the reconstructed output electrical pulse signal.

14. The method for measuring the speed of sound according to claim 13,
    wherein the generated output electrical pulse signal has a waveform,
        which has a dominant cycle with a maximum amplitude, and
        wherein the amplitude of the end portion of the output electrical pulse signal tapers off to either zero or a smaller value as compared to the maximum amplitude of the output electrical pulse signal in its dominant cycle.

15. The method for measuring the speed of sound according to claim 14,
wherein the generated output electrical pulse signal has a waveform with an initial portion whose amplitude is smaller than the maximum amplitude of the output electrical pulse signal.

16. The method for measuring the speed of sound according to any of the claims 13 to 15, wherein the speed of sound is determined using
a first time instance, when the peak of the second half-cycle of the dominant cycle of the reconstructed output electrical pulse signal is detected, and
a second time instance, when the peak of the second half-cycle of the dominant cycle of the reconstructed reflected electrical pulse signal is detected.

17. The method for measuring the speed of sound according to claim 14, wherein the speed of sound is determined using
a first time instance, when the peak of the second half-cycle of the dominant cycle of the reconstructed output electrical pulse signal is detected, and
a second instance, when the peak of the second half-cycle of the dominant cycle of the reconstructed reflected electrical pulse signal is detected.

18. The method for measuring the speed of sound acoording to claim 17,
wherein the first thershold and the second thershold have the same value.

* * * * *